UNITED STATES PATENT OFFICE.

JACOB S. ROBESON, OF AU SABLE FORKS, NEW YORK.

PROCESS OF TREATING ROADS, &c.

1,069,029.  Specification of Letters Patent.  Patented July 29, 1913.

No Drawing.  Application filed November 20, 1908.  Serial No. 463,709.

*To all whom it may concern:*

Be it known that I, JACOB S. ROBESON, a citizen of the United States, and a resident of Au Sable Forks, Essex county, New York, have invented an Improved Process of Treating Roads, &c., of which the following is a specification.

The object of my invention is to provide means for preventing or retarding the formation of dust upon roadways, and a further object of my invention is to effect the formation of a road or road surface. Many attempts have been made to accomplish this result by the use of various liquids, but in the main while they have tended to improve the surface by keeping the same in a more compact and wear-resisting condition, they have not prevented the formation of dust after the initial application of the surfacing material, nor have they maintained the proper coherence between the surface of the road and the body or bed of the same. Practically their only purpose, and result, was to compact the surface layer by producing a simple liquid adhesion between the dust or sand particles.

The material which I propose to use as a road-surfacing and road making agent is slightly hygroscopic in its nature; its hygroscopic property being substantially sufficient to keep the road in a dustless condition as long as any of the original material is left, and it has the further property of producing a profound and advantageous change in the physical relation in and of the solid particles of the road surface.

In the manufacture of paper pulp under what is known as the "sulfite process" which consists in boiling wood and other fibers under pressure in a solution containing sulfurous acid and a base (or bases) such as lime or magnesia, (or lime and magnesia) a vast quantity of a watery mixture known as sulfite waste liquor or waste sulfite of cellulose liquor is produced, that hitherto has had little value, besides being highly objectionable in a number of ways and very difficult of disposal. In the patent granted to me October 15, 1906, No. 833,634, a process of treating such waste liquor for the purpose of recovering the greater portion of the colloidal matter, as well as all of the contained resins, gums, and other extracted constituents of the woody tissues, and the product of such process are fully described and claimed. The material which I employ as the means of surfacing or building roads is said product, a concentrated body made in accordance with the patented process from waste sulfite liquor. Such material contains the natural organic constituents of the original sulfite liquor in a substantially undecomposed state and retaining all of their properties which I have found to be valuable for the present purpose, while it does not have the tendency to undergo spontaneous chemical changes characterizing the original thin sulfite liquor, even on redilution.

The material produced in accordance with my process set forth in the above named patent is a dark liquid mass, having usually been evaporated to quite a thick consistency, is soluble in water, and in addition to containing in a substantially unaltered state all of the gums, resins, and other extractive matters of the wood, it carries some lime, and certain proportions of salts of sulfuric and sulfurous acid. Most of the lignin of the original wood is contained in this liquid as a soluble body containing the lignin and sulfur united with lime or other base to form a compound usually termed a lignosulfonate. Whether or no there be tannic acid as such dissolved in the liquid, it has tanning properties and is, in many respects, analogous to tannin solutions. This concentrated material is preferably diluted somewhat before use, the amount of dilution and the manner of application to the road depending very largely upon the character of the latter. The application may be in any of the ordinary ways as by sprinkling, etc. If, for instance, it be a macadam road with a hard surface, free from dust, it is advisable to make the mixture with water relatively thick, say using sixty per cent. of the concentrated liquor and forty per cent. of water. As the amount of dust on the road increases, so must the amount of water increase, so that upon an ordinary dirt road composed of the local soil, which always contains more or less clay the best proportions are twenty-five per cent. of the concentrated liquor and seventy-five per cent. of water.

So- far as my present experience has shown, the best results are obtained when about three-tenths of a gallon of the concentrated liquor is applied to one square yard of road surface, although it is possible that further experience will show this amount to be excessive for a hard road surface and perhaps, deficient for a soft road, and the best proportions range from one-tenth to five-tenths of a gallon of the concentrated material, to a square yard of road surface.

On track work, speedways, &c., having a relatively springy body and surface, the method of preparing the surface binding material or applying the same, is somewhat different, a methodical treatment being advisable. In the first application, the mixture should be very thin so as to insure good penetration while the last application should be of a thicker nature so as to make a thicker impregnation in the coating or surface on the top.

There seems to be some physical or chemical change in the material of the road's surface after the concentrated sulfite liquor has been applied to the same, and though this must be different with the different road surfaces it appears to be invariably advantageous. The concentrated material when applied to the road surface is usually neutral, or perhaps slightly basic, but whether it be on a stone road or a dirt road, it slowly becomes acid by absorption from the air, the rain, the water with which it was mixed, and the acids present in the soil. There is a slight deposit of sulfate of lime and the substance contained in the concentrated liquor, have an effect upon the physical character of the soil, making it more plastic and adhesive. While this is probably just as true of a stone road as it is of a dirt road, naturally, by reason of the greater density of the stone road's surface, and the greater size of the particles the peculiar action is slower and the primary noticeable results on a stone road are possibly mainly due to the adhesive character of the concentrated material.

I am aware of the use of oil as a means of laying the dust upon roads, and while oil is relatively effective for this purpose it is not in any sense a road maker, as distinguished from a road preventive since it simply damps the dust and keeps it from rising, but does not retain it or cause it to adhere to the rest of the dirt or soil and pack into the road surface properly. Nor does it have any chemical or physical effect on the fine mineral matter of the road surface, acting mainly by virtue of its liquidity and the production of liquid adhesion when first applied, though by subsequent evaporation it frequently leaves a sticky adhesive residuum which acts as an ordinary adhesive, which residuum, in the use of some oils, may be asphaltic in its nature.

Though oil may damp and cause the dusty and heavier particles of the road to adhere more or less to one another, it does not in any way change them or compact or bind them into the road surface or fill the voids of the same and the wheels of vehicles passing over such a damped surface pick up clods of the cohering dust or heavier particles and move them along the road surface.

The concentrated sulfite liquor which I use as a dust preventive and road builder acts in a manner quite different from oil applied for the same purpose. Aside from its specific action, (either chemical or physical, or, perhaps, both) upon loose dusty particles, when first applied it causes the loose dust particles on the road surface to cohere and remain in the position where they were caught by the liquid applied. Any passing load, as of a wheel or a roller while these particles are initially damp or at any time when they may have become damp at some later period by reason of dew or rain, forces them into the crevices of the road surface and places them back where they originally belonged or puts them into voids caused by friction and makes them act again as they did when the road surface was absolutely new, viz., as binders between the stones forming the surface and body of the road, thus completing the arch and insuring its solidity.

When the applied concentrated material strikes a road surface that is relatively free from dust it penetrates the same to a greater or less degree and by reason of its adhesive action holds the finer particles in their proper places, as well as changes their nature in some manner. When dust is formed by friction, it retains this dust and enables it to be packed into the voids that form from time to time. While this result is perhaps more true with reference to a stone road surface, it will be readily understood that the same thing, in a slightly different form, perhaps, is true of a dirt road composed of the ordinary soil of the vicinity or of a loose road surface, and my experience has shown that a loose road surface treated with the concentrated sulfite liquor finally becomes hard and solid. The original thin sulfite waste liquor as it comes from the digester is much less suitable, as it is quite sensitive to atmospheric and other influences, readily decomposing. After concentration in the manner described in the acknowledged patent, however, the liquor loses much of this sensitiveness, even on redilution.

From the foregoing it will be evident that the concentrated sulfite liquor is a highly valuable material as a road-maker, and by reason of this value and the fact that it is of such a nature as to extract moisture from the atmosphere it acts as a perfect dust-retarder.

In view of the fact that the concentrated material is soluble in water, it would be reasonable to expect some loss due to heavy rains. In practice, however, it seems to stand considerable wetting before losing its virtue of uniting the particles of dirt and dust forming the top surface of the road. With a view, however, of obviating any tendency of the concentrated sulfite liquor to wash out under the influence of heavy rains I may treat the road prepared with the sulfite liquor with a thin film or surface coating of oil. This is best accomplished by spreading the same upon the road with compressed air after the concentrated sulfite liquor has been applied, and permanent and good results can be obtained with the use of a drying oil. Any of the common oils may be employed as an oily surfacing material, however, and petroleum is not only suitable but preferable on account of its relative cheapness. This petroleum may have an asphalt base, either naturally contained, as in the case of California and some Texas oils, or artificially added, as in the case of admixtures of asphalt with Pennsylvania and like oils. There are a number of other ways of constructing a road with the use of the concentrated waste sulfite liquor. For instance a road of the ordinary character as to the sub-grade may have placed upon the top as a wearing course, a layer several inches deep, say, approximately six inches in thickness, of mineral road material mixed with concentrated sulfite liquor, in the proportion of about three (3) to eight (8) gallons of concentrated sulfite liquor to the cubic yard. By admixing sulfite liquor with the road material, impregnation may be secured to a depth very substantially greater than can be attained with a surface application. The liquor may also be mixed with earth, powdered rock, gravel and other road building materials in this and other proportions. So far as proportions of material go, it is certain that better and more lasting results will be attained with the concentrated sulfite liquor in relatively large proportions. Commercially, however, the proportions for the different roads must be determined by experiment, as it is certain that hard roads, such as Telford and macadam, do not require so much as soft dirt roads, as I have noted, while on the other hand tracks, speedways, etc., require a method of treatment entirely different from either stone, or soft dirt roads.

Concentrated sulfite waste liquor of the character described has a peculiar action upon finely powdered mineral matter such as forms the surface of all ordinary unpaved roadways. As to the nature of this action I am at present unaware, and it may be either chemical or physical, or, more probably, both; the action being perhaps similar to that which tannin exercises upon clay and similar fine mineral matters of a more or less colloid nature, the colloid matters of such sulfite waste liquor resembling tannin in many other respects. At all events, when applied to a roadway containing greater or less proportions of fine mineral matter of a clayey nature, or of materials tending to yield clay, as is the case with all dirt roads (roads made from local soil), it affects the plasticity of the surface materials and changes their character in some manner so that the surface does not dust freely and dries down in a hard compact way; so that it becomes, so to speak, of a more or less horny nature. This effect is particularly noticeable upon dirt roads containing large amounts of clay or loam. With a stone road containing less dust and dirt the action is slower; but still exists; and particularly with road materials tending to yield clay upon breaking down by physical or chemical action.

I claim:

1. The method of treating roads and road surfaces containing clay or clay yielding materials to compact the same and retard and substantially prevent the formation of dust which comprises coating or sprinkling roadways comprising such materials with a somewhat diluted solution of a concentrated and chemically undecomposed body of neutralized sulfite waste liquor.

2. The method of treating roads and road surfaces comprising clay or clay-yielding materials to compact the same and retard and substantially prevent the formation of dust, which consists in coating or sprinkling such roads or road surfaces with a concentrated body of sulfite waste liquor.

3. The method of treating roads and road surfaces comprising clay or clay-yielding materials to compact the same and retard and substantially prevent the formation of dust, which consists in coating or sprinkling such roads or road surfaces with a concentrated and chemically undecomposed body of sulfite waste liquor.

4. The method of treating roads and road surfaces comprising clay or clay-yielding materials to compact the same and retard and substantially prevent the formation of dust, which consists in treating such roads and road surfaces by coating, sprinkling or otherwise applying to the same and to the material composing the same a somewhat diluted solution of a concentrated and chemically undecomposed body of neutralized sulfite waste liquor.

5. A road comprising clay or clay-yielding materials and having its surface coated or sprinkled with a diluted solution of a mixture comprising a concentrated and chemically undecomposed body of sulfite waste liquor.

6. A road comprising clay or clay-yielding materials and having its surface coated or sprinkled with a body of concentrated sulfite waste liquor.

7. A road comprising clay or clay-yielding materials and having its surface coated or sprinkled with a body of concentrated and chemically undecomposed sulfite waste liquor.

8. A road comprising clay or clay-yielding materials and having its surface coated and its body impregnated with a dilute solution of a body comprising a mass of concentrated and chemically undecomposed sulfite waste liquor.

9. In the production of a hard, compact and permanent roadway the method which comprises incorporating with road materials comprising clay or clay-yielding materials a composition comprising the organic matters of a concentrated and chemically undecomposed body of neutralized sulfite waste liquor.

10. The process of treating a road bed containing clay or clay yielding materials which comprises incorporating a binder comprising the characteristic sulfur containing organic matters of a concentrated sulfite waste liquor substantially throughout the wearing course of said bed and substantially sealing the surface portion thereof against moisture.

11. The process of making roads which comprises treating a road surface containing clayey matter with a concentrated waste sulfite liquor preparation and thereafter applying oil.

12. The process of making roads which comprises treating a road surface containing clayey matter with a concentrated waste sulfite liquor preparation in a diluted state and thereafter applying oil.

13. The process of making roads which comprises treating a road surface containing clayey matter with a concentrated waste sulfite liquor preparation and thereafter applying oil containing an asphaltic base.

14. As a new article of manufacture, a roadway containing clayey matter having its surface particles impregnated with, altered by and united by a concentrated waste sulfite liquor preparation and having an oil seal for said altered and united particles.

15. In the production of a hard, compact and permanent roadway the method which comprises incorporating with road materials comprising clay or clay-yielding materials a composition comprising the characteristic sulfur containing organic matters of a concentrated sulfite waste liquor, said organic matters being in a substantially undecomposed condition.

16. A compacted, hardened and permanent road comprising clay or clay-yielding materials and also comprising the characteristic sulfur containing organic matters of a concentrated waste sulfite liquor.

In testimony whereof, I have signed my name to this specification, in the presence of two subscribing witnesses.

JACOB S. ROBESON.

Witnesses:
F. J. PINE,
ROBT. CALDWELL.